US010529970B2

(12) United States Patent
Albukrek et al.

(10) Patent No.: US 10,529,970 B2
(45) Date of Patent: Jan. 7, 2020

(54) PRESSURE EQUALISING DEVICE

(71) Applicant: Bimed Teknik Aletler Sanayi ve Ticaret A.S., Buyukcekmece Istanbul (TR)

(72) Inventors: Yilmaz Albukrek, Yesilkoy Istanbul (TR); Klaus Kempf, Stuttgart (DE)

(73) Assignee: BIMED TEKNIK ALETLER SANAYI VE TICARET A.S., Buyukcekmece Istanbul (TR)

( * ) Notice: Subject to any disclaimer, the term of this patent is extended or adjusted under 35 U.S.C. 154(b) by 11 days.

(21) Appl. No.: 15/747,443

(22) PCT Filed: Jul. 28, 2016

(86) PCT No.: PCT/EP2016/068026
§ 371 (c)(1),
(2) Date: Jan. 25, 2018

(87) PCT Pub. No.: WO2017/017199
PCT Pub. Date: Feb. 2, 2017

(65) Prior Publication Data
US 2018/0219200 A1   Aug. 2, 2018

(30) Foreign Application Priority Data

Jul. 28, 2015   (DE) .................. 10 2015 214 256

(51) Int. Cl.
*H01M 2/12*   (2006.01)
*F16K 17/19*   (2006.01)
(Continued)

(52) U.S. Cl.
CPC ........... *H01M 2/1264* (2013.01); *F16K 17/02* (2013.01); *F16K 17/025* (2013.01);
(Continued)

(58) Field of Classification Search
CPC .............. H01M 2/1264; H01M 2/1276; Y10T 137/7847; Y10T 137/7734; F16K 17/02;
(Continued)

(56) References Cited

U.S. PATENT DOCUMENTS 2,690,466 A * 9/1954 Kendall ............. H01M 2/1205
429/53
2,702,046 A * 2/1955 Zimmer .................. A47J 27/09
137/467
(Continued)

FOREIGN PATENT DOCUMENTS

DE   102010051687 A1   5/2012
DE   102013213909 A1   1/2015
(Continued)

*Primary Examiner* — Marina A Tietjen
*Assistant Examiner* — Frederick D Soski
(74) *Attorney, Agent, or Firm* — Leydig, Voit & Mayer, Ltd.

(57) ABSTRACT

A pressure compensation device for compensating an internal pressure in a housing of an electrochemical device includes: at least one gas-permeable membrane for gas exchange between an interior of the housing and surroundings of the electrochemical device; and a valve body that can be transferred from a home position resting on a valve seat into a use position remote from the valve seat, the valve body including a gas throughflow opening that is sealed by the gas-permeable membrane.

14 Claims, 1 Drawing Sheet

(51) Int. Cl.
*F16K 17/04* (2006.01)
*F16K 17/02* (2006.01)

(52) U.S. Cl.
CPC ........ *F16K 17/042* (2013.01); *F16K 17/0493* (2013.01); *F16K 17/19* (2013.01); *H01M 2/1276* (2013.01); *Y10T 137/7734* (2015.04); *Y10T 137/7847* (2015.04)

(58) Field of Classification Search
CPC ... F16K 17/025; F16K 17/042; F16K 17/0493
USPC .......................................... 251/66, 67, 73, 75
See application file for complete search history.

(56) References Cited

U.S. PATENT DOCUMENTS

| | | | | |
|---|---|---|---|---|
| 3,507,708 | A * | 4/1970 | Vignaud | H01M 2/12 220/373 |
| 3,615,868 | A * | 10/1971 | Melone | G01F 23/2922 137/559 |
| 3,800,736 | A * | 4/1974 | Krohn | G01L 19/12 116/268 |
| 4,052,534 | A | 10/1977 | Devitt | |
| 4,143,787 | A * | 3/1979 | Walker | A47J 27/09 137/467 |
| 4,517,262 | A * | 5/1985 | Beidler | H01M 2/1205 429/53 |
| 4,636,446 | A * | 1/1987 | Lee | H01M 2/1211 429/54 |
| 5,209,992 | A * | 5/1993 | Feres | H01M 2/1205 429/86 |
| 5,320,136 | A * | 6/1994 | Morris | F16K 15/021 137/516.29 |
| 5,422,199 | A * | 6/1995 | Adams | H01M 2/1205 429/88 |
| 5,486,429 | A * | 1/1996 | Thibault | H01M 2/12 429/403 |
| 6,475,658 | B1 * | 11/2002 | Pedicini | H01M 6/50 429/407 |
| 7,378,180 | B2 * | 5/2008 | Causton | H01M 2/1294 429/53 |
| 9,735,407 | B2 | 8/2017 | Kusunoki et al. | |
| 2005/0208369 | A1 | 9/2005 | Puhlick et al. | |
| 2013/0032219 | A1 | 2/2013 | Heim et al. | |
| 2014/0193674 | A1 * | 7/2014 | Takasaki | H01M 2/1077 429/53 |
| 2015/0072184 | A1 * | 3/2015 | Kusunoki | H01M 2/1223 429/54 |
| 2017/0244081 | A1 * | 8/2017 | Tononishi | H01G 9/10 |
| 2018/0159101 | A1 * | 6/2018 | Tsang | H01M 2/1282 |

FOREIGN PATENT DOCUMENTS

| | | |
|---|---|---|
| DE | 102014217977 A1 | 3/2015 |
| EP | 2554882 A1 | 2/2013 |

* cited by examiner

PRESSURE EQUALISING DEVICE

CROSS-REFERENCE TO PRIOR APPLICATIONS

This application is a U.S. National Phase application under 35 U.S.C. § 371 of International Application No. PCT/EP2016/068026, filed on Jul. 28, 2016, and claims benefit to German Patent Application No. DE 10 2015 214 256.6, filed on Jul. 28, 2015. The International Application was published in German on Feb. 2, 2017 as WO 2017/017199 under PCT Article 21(2).

FIELD

The invention relates to a pressure compensation device for compensating an internal pressure in a housing of an electrochemical device, comprising at least one gas-permeable membrane for gas exchange between an interior of the housing and surroundings of the electrochemical device.

BACKGROUND

A device of this kind is usually used for compensating pressure inside a battery/accumulator. The internal pressure of a closed battery system should be adjusted to the external pressure, so that the battery housing is not damaged. The internal pressure can be greater or smaller than the external pressure, depending on the field of application of the battery (atmospheric pressure difference for a motion battery, pressure difference due to temperature difference).

A pressure compensation device is known from EP 2 554 882 A1. In the known pressure compensation device, the gas-permeable membrane deforms according to the internal pressure of the housing and is destroyed by the tip of an emergency degassing spike when a limiting pressure is exceeded. For this purpose, the dimensions and the material of the membrane, the geometry of the emergency degassing spike and the distance of said spike from the membrane must each be precisely designed and accurately matched to one another, so that the membrane remains intact if the limiting pressure is not reached, and deforms when the limiting pressure is exceeded in such a way as to be destroyed by the emergency degassing spike.

SUMMARY

In an embodiment, the present invention provides a pressure compensation device for compensating an internal pressure in a housing of an electrochemical device, comprising: at least one gas-permeable membrane configured for gas exchange between an interior of the housing and surroundings of the electrochemical device; and a valve body configured to be transferred from a home position resting on a valve seat into a use position remote from the valve seat, the valve body comprising a gas throughflow opening that is sealed by the gas-permeable membrane.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
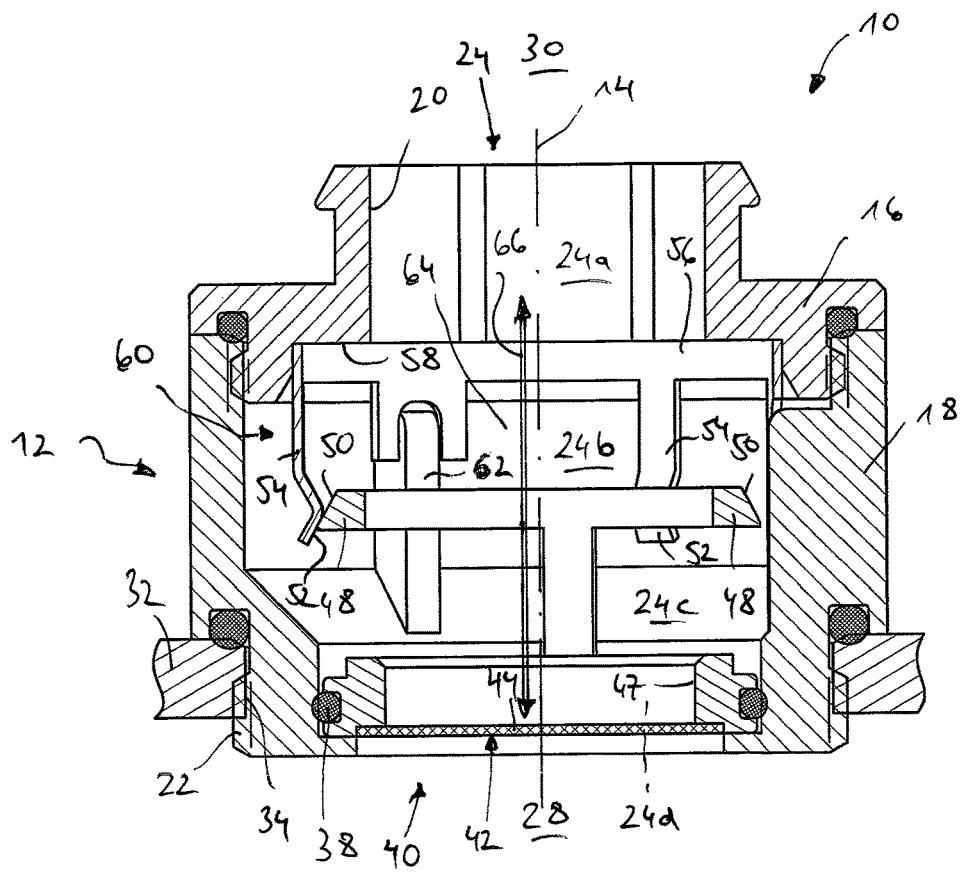
FIG. 1 is a side view of an embodiment of a pressure compensation device having a valve body in the home position.

In an embodiment, the present invention provides a pressure compensation device of the type mentioned at the outset, in that the pressure compensation device comprises a valve body which can be transferred from a home position resting on a valve seat into a use position remote from the valve seat when a limiting internal pressure is exceeded, and in that the valve body comprises a gas throughflow opening that is sealed by the gas-permeable membrane.

According to the invention, a valve body is provided which is transferred from a home position into a use position when a limiting internal pressure is exceeded. The valve body hereby lifts off a valve seat and frees a flow path between the valve seat and the raised valve body. Said flow path allows the rapid discharge of large amounts of gas.

During normal operation of the battery, the valve body, in the home position thereof, rests on the valve seat, thus sealing the aforementioned flow path. The valve body comprises a gas throughflow opening which is sealed by the gas-permeable membrane. This allows for gas exchange while the valve body is in the home position thereof.

In a pressure compensation device according to the invention, it is not necessary for the gas-permeable membrane to be destroyed when a limiting internal pressure is exceeded. This makes it possible to optimize the gas-permeable membrane with regard to a gas exchange capacity that is as high as possible. The gas-permeable membrane can also be designed so as to be relatively robust, in order to simplify handling of the pressure compensation device.

The pressure compensation device can thus be designed, with respect to a specified limiting internal pressure, independently of the dimensions and the material of the gas-permeable membrane, as said dimensions and material need not have any defined deformation properties. It is also not necessary to provide a precisely positioned emergency degassing spike.

According to the invention, it is possible to allow high gas exchange volumes during normal operation of a battery and, at the same time, to discharge a large amount of gas within a very short time and considerably reduce the risk of the entire battery exploding, in the case of a sudden, explosive increase in the internal pressure of the battery (e.g. caused by the explosion of a faulty battery cell).

The pressure compensation device according to the invention has the advantage that exceeding a limiting internal pressure is not associated with destruction or ejection of components or portions of said device. The surroundings of the pressure compensation device are thus protected from damage, without the need for safety mechanisms to be provided for this purpose, which mechanisms could impede rapid discharge of large amounts of gas.

In a preferred embodiment, the valve body comprises a valve surface to which the internal pressure is applied, and the valve surface is formed by a surface of the gas-permeable membrane at least in part. It is thus possible to use at least a portion of the valve surface for arranging the gas-permeable membrane. In this case, the larger the portion of the gas-permeable membrane on the valve surface, the larger a gas flow cross section which can be provided for a specific valve body size. It is accordingly particularly preferable for the valve surface to be entirely or substantially entirely formed by the gas-permeable membrane.

In order to increase a gas flow cross section, it is also preferable for the gas-permeable membrane to extend in a membrane plane which extends, in particular perpendicularly, to a movement axis of the valve body.

A compact design together with a gas flow cross section which is as large as possible result if the gas-permeable membrane and the movement axis are arranged concentrically relative to one another.

It is conceivable for the valve body to be held on the valve seat using a destructible connection, and for said connection to fail when the limiting internal pressure is exceeded. However, it is preferable for the pressure compensation device to comprise a power generating mechanism which counteracts the internal pressure and holds the valve body in the home position provided that the limiting internal pressure is not exceeded. A power generating mechanism of this kind is in particular a spring, which interacts with the valve body and pushes said valve body towards the valve seat. This has the advantage that the valve body can be actuated repeatedly. This is particularly advantageous if the gas-permeable membrane is designed so as to be sufficiently robust that, when the limiting internal pressure is exceeded, only the valve body is transferred into the use position, but the gas-permeable membrane is not destroyed in the process. This makes it possible to provide a pressure compensation device which is reusable and allows repeated discharge of large amounts of gas when a limiting internal pressure is exceeded.

In order to easily mount the pressure compensation device on a housing of an electrochemical device, it is preferable for the pressure compensation device to comprise a housing insert which can be fastened on or in an opening of the housing of the electrochemical device.

A housing insert of this kind preferably comprises an interior that is used for arranging the valve body and the gas-permeable membrane connected to the valve body.

The pressure compensation device according to the invention allows for gas to be guided along a gas exchange path when the valve body is in the home position, and for gas to be guided along a flow path which differs from the gas exchange path when the valve body is in the use position. Different paths can therefore be provided, which can be optimized in each case with regard to the normal operation of the pressure compensation device (gas exchange path) and with regard to the emergency operation of the pressure compensation device (flow path).

It is particularly preferable for the flow path, which is active during the emergency operation of the pressure compensation device, to extend around the valve body.

Figure 2:
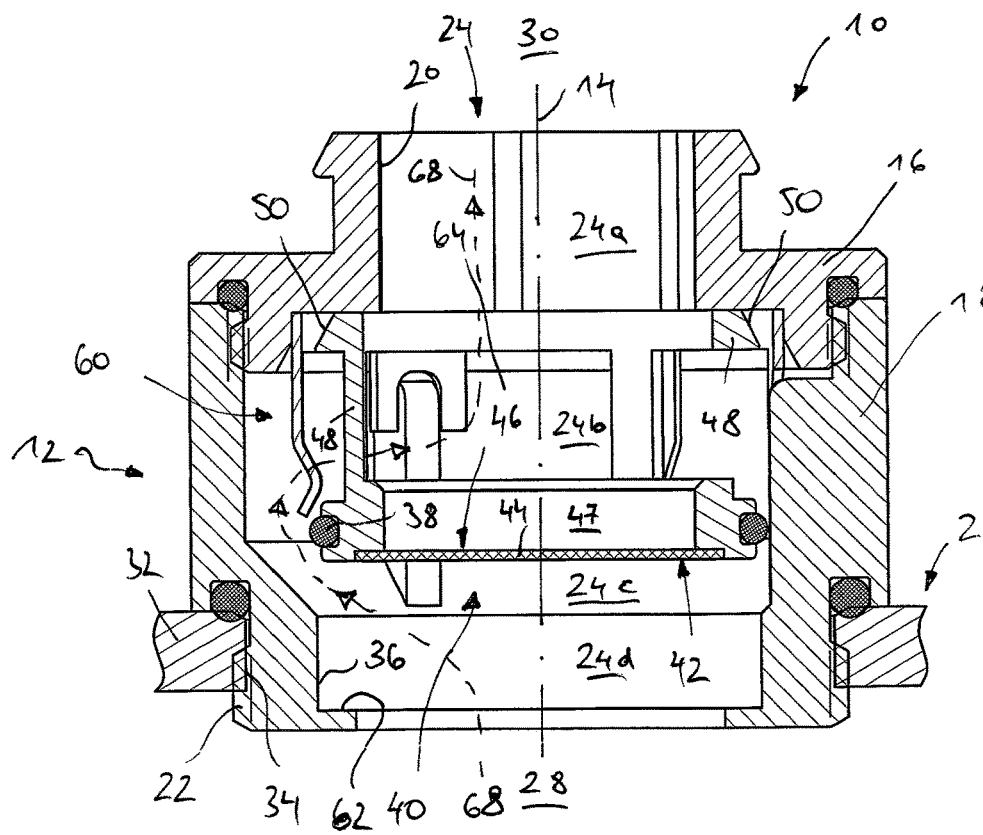
FIG. 2 is a side view of a pressure compensation device according to FIG. 1 having the valve body in the use position.

FIGS. 1 and 2 show an embodiment of a pressure compensation device 10, denoted overall by reference sign 10, comprising a housing insert 12. The housing insert 12 extends along a central axis 14 between a cover portion 16 and a mounting portion 18.

The cover portion 16 comprises at least one gas passage opening 20. The mounting portion 18 comprises a press-fit portion or threaded portion 22.

The housing insert 12 further comprises an interior 24 which extends along the central axis 14 and has a plurality of interconnected portions 24*a*, 24*b*, 24*c*, 24*d* that merge into one another.

The pressure compensation device 10 is used for compensating an internal pressure in a housing 26 of an electrochemical device, in particular a battery, the interior of which is denoted in the drawings by reference sign 28. The surroundings of the housing 26 are denoted by reference sign 30.

The housing 26 comprises a housing wall 32 having a housing opening 34. The mounting portion 18 of the housing insert 12 is bolted, press-fitted and/or latched to a boundary of the housing opening 34.

The housing insert 12 comprises a valve seat 36 (cf. FIG. 2), preferably arranged on the end of said housing insert which faces the interior 26. The valve seat 36 extends, preferably in an annular manner, around the central axis 14, and at the same time forms a boundary surface of the interior portion 24*d*.

The valve seat 36 interacts with a seal 38 (cf. FIG. 1) of a valve body, which is denoted overall by reference sign 40. The valve body 40 can be moved along the central axis 14. The valve body 40 comprises, on the surface thereof facing the interior 28 of the housing 26, a sealing surface 42 which is formed by the outer face of a gas-permeable membrane 44, at least in part and preferably entirely. The gas-permeable membrane 44 is preferably discoid.

The gas-permeable membrane 44 is rigidly connected to the valve body 40 by adhesion or the like. The valve body 40 comprises a gas throughflow opening 47 which is in fluid communication with an inner face 46 of the membrane 44.

On the end thereof which faces the surroundings 30 of the housing 26, the valve body 40 comprises a plurality of stop elements 48 that are distributed along the periphery of the valve body 40. Three stop elements 48, for example, are provided so as to be mutually spaced at an angular distance of 120°. The stop elements 48 comprise stop surfaces 50 which are preferably inclined relative to the central axis 14.

The stop surfaces 50 interact with support surfaces 52 which are formed by spring arms 54. The spring arms 54 extend substantially in parallel with the central axis 14 and protrude from an annular body 56 which is supported on a shoulder 58 of the housing insert 12.

The spring arms 54 form a power generating mechanism 60 which exerts a pressure on the stop surfaces 50 of the valve body 40 by means of the surfaces 52, thereby pressing the sealing surface 42 of the valve body 40 against a shoulder 62 (cf. FIG. 2) of the valve seat 36.

The valve body 40 and the power generating mechanism 60 are preferably prevented from rotating about the central axis 40, for example by an anti-turn portion 62 which is rigidly connected to the housing insert 12. As a result, the stop elements 48 and the spring arms 54 together have to extend over only a small portion of the periphery of the valve body 40, and therefore free spaces 64 remain, viewed in the peripheral direction, between the stop elements 48, and in the peripheral direction between the spring arms 54, through which spaces gas can flow.

During normal operation of the electrochemical device, the valve body 40 is located in the home position thereof (cf. FIG. 1). The pressure in the interior 28 is so low that an opening force, which results from multiplication of the internal pressure in the interior 28 and the valve surface 42, is not sufficient to overcome the force of the force generating mechanism 60 that acts in the opposing direction. When the valve body is in the home position, a gas exchange takes place through the gas-permeable membrane 44 in order to allow pressure compensation between the interior 28 of the electrochemical device and the surroundings 30. In this case, the gas to be exchanged is guided along a gas exchange path 66 substantially in parallel with the central axis 14 of the housing insert 12. During the gas exchange, gas also flows through the gas throughflow opening 47 of the valve body 40.

In the case of a malfunction, the pressure in the interior 28 of the electrochemical device may suddenly increase. In order to prevent or minimize damage, it is then desirable to rapidly discharge large amounts of gas from the interior 28 of the electrochemical device into the surroundings 30. The power generating mechanism 60 is therefore designed so that, when a limiting internal pressure is reached, the closing force of the power generating mechanism 60 is overcome by the pressure applied to the sealing surface 42 and the opening force generated thereby. In this case, the valve body 40 moves from the home position thereof, resting on the sealing seat 36 (cf. FIG. 1), to a use position which is elevated from the valve seat 36 (cf. FIG. 2). While the valve body 40 is moving from the home position to the use position, the surfaces 52 of the spring arms 54 are resiliently deformed radially outwards so that the stop surfaces 50 of the stop elements 48 can slide along the surfaces 52, and the valve body 40 moves out of the valve seat 36 in a direction in parallel with the central axis 14.

When the valve body is in the use position, a flow path, denoted by reference sign 68 in FIG. 2, is formed, which differs from the gas exchange path 66 of normal operation. The flow path 68 leads from the interior 28, via the interior portion 24*d* and the adjacent, radially enlarged interior portion 24*c*, radially outwards around the seal 38 of the valve body 40, between the spring arms 54 and the stop elements 48, viewed in the peripheral direction, then on to a central region of the interior portion 24*b* and finally over the interior portion 24*a* and to the surroundings 30.

Flowing around the gas-permeable membrane 44 along the flow path 68 has the advantage that large amounts of gas can be discharged within a short period of time. The gas-permeable membrane 44 thus preferably remains intact.

In the embodiment shown in the drawings, the spring arms 54 spring back radially inwards after being deflected radially outwards and, if the valve body is in the home position thereof, are no longer in contact with the valve body 40. It is also conceivable, however, for the spring arms 54 to be shaped so as to remain in contact with the stop elements 48, and such that the valve body 40 is automatically transferred back from the use position thereof to the home position thereof after the gas has been discharged and after the pressure in the interior 28 has decreased.

In the embodiment shown in the drawings, it is possible to press the valve body 40 back into the home position (cf. FIG. 1) from the use position (cf. FIG. 2) manually or using a tool. Easy access is possible through the interior portion 24*a*.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A pressure compensation device for compensating an internal pressure in a housing of an electrochemical device, comprising:
    at least one gas-permeable membrane configured for gas exchange between an interior of the housing and surroundings of the electrochemical device;
    a valve body configured to be transferred from a home position resting on a valve seat into a use position remote from the valve seat, the valve body comprising a gas throughflow opening that is sealed by the gas-permeable membrane; and
    a pressure generating mechanism configured to counteract the internal pressure and to hold the valve body in the home position, provided that the internal limiting pressure is not exceeded, the pressure generative mechanism further configured such that, when the internal limiting pressure is exceeded, the pressure generating mechanism releases the valve body such that it can move to the use position,
    wherein when the valve body is in the use position, the pressure generating mechanism is remote from and does not act on the valve body.

2. The pressure compensation device according to claim 1, wherein the valve body comprises a valve surface to which the internal pressure is applied, and
    wherein the valve surface is formed by a surface of the gas-permeable membrane at least in part.

3. The pressure compensation device according to claim 2, wherein the valve surface is entirely or substantially entirely formed by the gas-permeable membrane.

4. The pressure compensation device according to claim 1, wherein the gas-permeable membrane extends in a membrane plane which extends at an angle to a movement axis of the valve body.

5. The pressure compensation device according to claim 4, wherein the gas-permeable membrane and the movement axis are arranged concentrically relative to one another.

6. The pressure compensation device according to claim 4, wherein the membrane plane extends perpendicularly to the movement axis.

7. The pressure compensation device according to claim 1, wherein the pressure generating mechanism comprises at least one spring arm.

8. The pressure compensation device according to claim 7,
    wherein the valve body comprises at least one stop element at a periphery of the valve body, the stop element comprising a stop surface,
    wherein the spring arm is configured such that, when in the home position, an end portion of the spring arm contacts the stop surface to hold the valve body in the home position, and wherein the spring arm is configured such that, when the internal limiting pressure is exceeded, the spring arm is first deflected radially outward allowing the valve body to move to the use position, and then springs back radially inwards.

9. The pressure compensation device according to claim 7, wherein the at least one spring arm comprises a plurality of spring arms spaced apart from each other in the radial direction.

10. The pressure compensation device according to claim 1, further comprising a housing insert configured to be fastened on or in an opening of the housing of the electrochemical device.

11. The pressure compensation device according claim 10, wherein the housing insert comprises an interior for arranging the valve body and the gas-permeable membrane that is connected to the valve body.

12. The pressure compensation device according to claim 1, wherein, when the valve body is in the home position, gas is guided along a gas-exchange path,
wherein, when the valve body is in the use position, gas is guided along a flow path which differs from the gas exchange path.

13. The pressure compensation device according to claim 12, wherein the flow path extends around the valve body.

14. The pressure compensation device according to claim 1, wherein, when in the use position, the valve body is configured to be pressed back into the home position where the valve body is held in place by the pressure generating mechanism.

* * * * *